United States Patent [19]
Burns et al.

[11] 3,885,415
[45] May 27, 1975

[54] CALIBRATION OF PARTICLE VELOCITY MEASURING INSTRUMENT

[75] Inventors: Richard H. Burns, Webster; Roger E. Button, Rochester; Alexander E. Martens, Fairport; Roger R. Morton, Penfield, all of N.Y.

[73] Assignee: Bausch & Lomb Incorporated, Rochester, N.Y.

[22] Filed: Oct. 19, 1973

[21] Appl. No.: 408,217

[52] U.S. Cl............................ 73/1 D; 73/3; 73/488; 250/222 PC; 356/27; 356/243
[51] Int. Cl....................... G01p 21/00; G01p 5/20
[58] Field of Search ......... 73/1 R, 3, 1 D, 488, 489; 250/573, 222 PC; 356/27, 28, 243

[56] References Cited
UNITED STATES PATENTS

| | | | |
|---|---|---|---|
| 3,127,464 | 3/1964 | Gustavson | 73/1 R UX |
| 3,517,308 | 6/1970 | Mirdadian | 73/3 X |

FOREIGN PATENTS OR APPLICATIONS

| | | | |
|---|---|---|---|
| 1,145,830 | 3/1963 | Germany | 73/1 R |

*Primary Examiner*—Richard C. Queisser
*Assistant Examiner*—Frederick Shoon
*Attorney, Agent, or Firm*—Frank C. Parker; Bernard D. Bogdon

[57] ABSTRACT

In an analytical apparatus for analysis of particulate motion in a flow cell, there is provided, for calibration of the analytical apparatus, a movable and preferably rotatable calibration disc generally disposed within the optical viewing path of the analytical system devoted to calculating particle related information. Appropriately located upon the surface of the disc is a predetermined number of contrast regions representing particles. The disc is rotated at a given rate within the optical viewing path and simulates predetermined particle movement for use in calibration of analytical devices for obtaining particle information.

11 Claims, 3 Drawing Figures

PATENTED MAY 27 1975 3,885,415
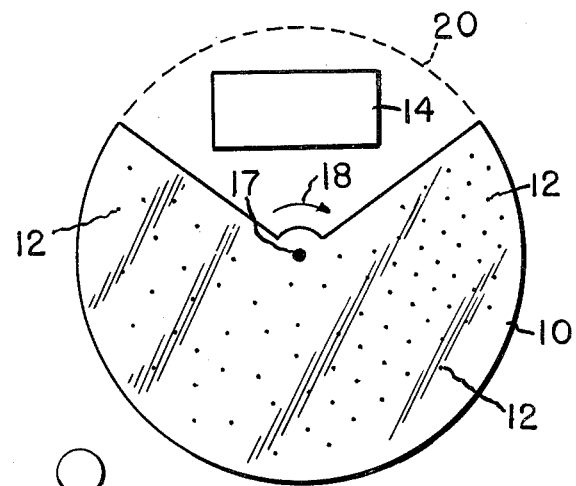
FIG. 1
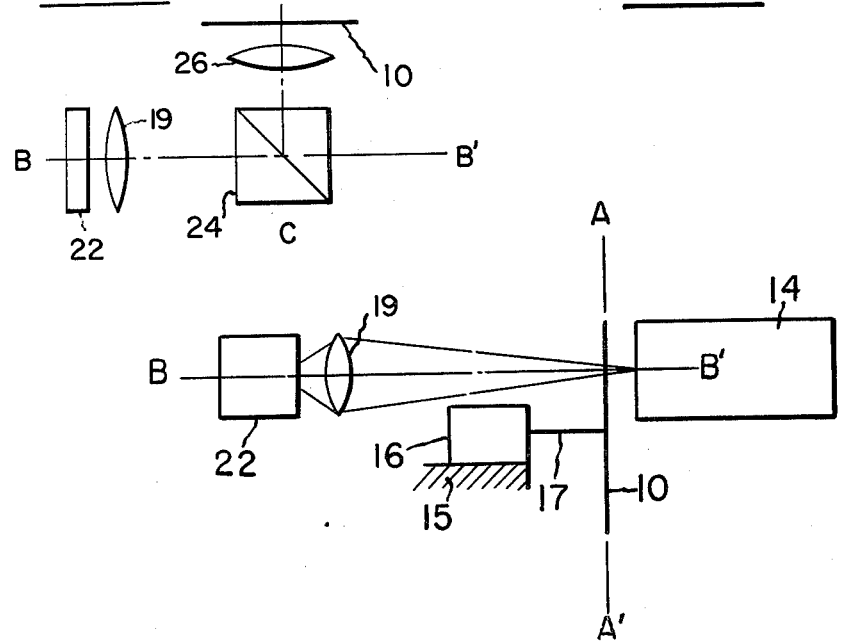
FIG. 3
FIG. 2

CALIBRATION OF PARTICLE VELOCITY MEASURING INSTRUMENT

FIELD OF THE INVENTION

The present invention relates to apparatus for and a method of automatically calibrating particle tracking devices, particularly for those devices having measurement cells for carrying fluid bearing particles.

SUMMARY OF THE INVENTION

A disc for modulating intensity of light in a system preferably for analytical study of fluid-borne particles, has disposed upon its surface, either randomly or preferably in a predetermined pattern, contrast areas and preferably areas of sharp contrast, such as dark areas on a light surface, simulating particles for use in calibration of the analytical system. The disc is moved and preferably rotated to pass, at a predetermined velocity, the areas of contrast before the transmitted light of the analytical system, or to appropriately reflect light into the system, to thereby obtain the type of information otherwise collected from the fluid-borne particles in the measuring cell. Images of the contrast areas moving with known velocity, simulate particle-movement related information as a check on the calibration of the analytical system.

BRIEF DESCRIPTION OF THE DRAWINGS

FIG. 1 is a front view of a rotatable calibration disc according to the principles of the present invention before a schematically illustrated analytical system;

FIG. 2 is a side view of the embodiment of FIG. 1 disposed before a vidicon tube in the analytical system; and FIG. 3 is a side view of an alternate embodiment according to the principles of the present invention illustrating a disc disposed outside of the optical path of the analytical system.

DETAILED DESCRIPTION OF THE PREFERRED EMBODIMENT

In a separate concurrently filed and copending patent application entitled "Calibration of Particle Velocity Measuring Instrument", Ser. No. 408,247 for applicant Roger E. Button, an alternate basis for consideration of the calibration of analytical systems involving fluid particle study is covered.

In present FIG. 1, a substantially flat calibration disc 10 has disposed thereon a number of typical calibration areas of contrast 12 for scanning by a vidicon tube included within an analytical system 14, schematically illustrated in the FIGURES. The analytical system 14 generally comprises an optical portion, scanning devices, including a vidicon tube and electrical signal generation devices which are more fully discussed hereinafter. It is easily appreciated that the contrast areas 12 need to optically differ in appearance from the surface of the disc on which the areas are disposed and, if optically designed for the light to pass through the disc, the disc material which makes up the thickness of the disc must also differ in appearance from the areas of contrast. The contrast in appearance, for example, can be due to shape or size or, as is preferred, due to color, shade or tone or some combination of the above. If the disc is not of transparent material, the particles may comprise undarkened areas of an otherwise darkened disc and could conceivably be holes within the disc. The areas of contrast are generally of the same size, but may comprise two or more size populations, and are disposed upon or adherred to the disc 10 in any suitable manner. The areas 12 may be formed upon a photographic film or include a pattern made by a ruling engine and comprise individual thin layers of chrome. It is easily appreciated that any appropriate replication procedure will provide a suitable contrasting pattern. On a transparent disc, such as light passing plastic or glass, the areas of contrast 12 may comprise, for example, small dots of paint. The image width of the particle simulating areas for calibration in an analytical system for analyzing liquid waste, for example, is approximately 0.4% of the field of view.

The areas of contrast 12 are preferably disposed upon a face of either side of the disc 10 in a predetermined pattern, but may be enclosed within a disc which is of transparent material. In order for the software of the embodiment disclosed in assignee's concurrently filed and copending patent application entitled "APPARATUS FOR AND METHOD OF AUTOMATICALLY DETERMINING VELOCITY RELATED PARAMETERS OF FLUID BORNE COLLOIDAL SUSPENSIONS", Ser. No. 408,202 for applicant Roger Morton, to be utilized in analysis of simulated particle movement for the presently disclosed invention, the pattern preferably should be formed for all particles to exhibit the same angular velocity with respect to the axis of rotation of the disc and further, for the pattern to substantially meet the criteria set forth for the ensemble average computation disclosed in the same R. Morton patent application. An ensemble average is formed by algebraically adding the motion in the direction of the horizontal axis or X coordinate direction of all features which have had a motion in the vertical axis or Y coordinate direction above a threshold level which is predetermined to be 2% of the vertical field of view and further, which have horizontal motion in the same sense as the previous ensemble average, unless the previous ensemble average is zero, in which case all horizontal motion of features meeting the vertical threshold criterion is included. The routine is made to have the ensemble average include the information only from those features which have motion within approximately two standard deviations of the overall motion of all the features in the field of view. In operation the program provides for the ensemble average to be set to zero and a new ensemble average formed to include information from all those features meeting the feature tracking criterion. Thereafter, the determined ensemble average is divided by 2, to further determine the standard deviation, and then the ensemble average is formed again. The value of the last formed ensemble average excludes information from features moving in the opposite direction of the ensemble, as well as from those features which have a velocity differing by two standard deviation measures from the motion of the features of the entire field of view. The disc 10 is fixedly disposed at base 15 through an electrically controlled motor 16 and a rotatable shaft 17 to rotate within a calibration plane of focus A–A' of the optical portion of the analytical system 14.

The location of the calibration plane of focus A–A' is dependent upon the structural limitations and disposition of the elements of any embodiment according to the principles of the present invention. In the illustrated embodiment, the disc 10 defines the calibration plane of focus and is preferably disposed very close to the vidicon face on which the image is formed in order to provide a sharp image for analysis. Primarily for convenience in design and manufacturing, the disc 10 is not disposed in the prime optical field of focus which passes through the measuring cell 14, although it might well have been. It will be appreciated that the closer the disc 10 is to the vidicon tube the sharper are the images of the calibration areas of contrast. Image shadows generated by the calibration areas of contrast diminish in size and have less and less adverse effects on the analytical results the closer the disc 10 is to the vidicon tube.

There are at least a sufficient number of areas of contrast for the analytical system 14 to generate information signals to very accurately calibrate the analytical system. The areas of contrast, for example, in a fluid waste system may number approximately thirty.

The disc 10 is rotated by means of the motor 16 which operates at a predetermined velocity. The disc may rotate, for example, in the direction of arrow 18 to dispose the areas of contrast 12 within the calibration plane of focus A–A' to intercept an optical axis B–B' defined by the beam of light from the analytical system 14 passing through a microscope objective lens 19.

As is illustrated in FIG. 1, the disc 10 is generally circular, but may have a segment removed from it in order for that wedged shaped area to be in-line with the optical axis B–B' at all times of operation of the analytical system 14 when calibration is not being conducted, as illustrated in FIG. 1. As an alternative, the disc may be completely circular, as defined by the disc 10 and an imaginary arcuate line 20, and be transparent at least at one area for optical viewing of the analytical system during operation. Further, a window, such as a hole, may be formed in the disc 10 to provide a clear optical path for the analytical system 14 during operation. The disc 10 is preferably near circular, as disclosed, for reasons of stability while being rotated and for space saving reasons within an instrument incorporating the analytical system and peripheral components. It will be appreciated that the disc is preferably symmetrical about its center. However, the perimeter of the disc or substrate may be of most any suitable shape or configuration.

Further, it will be appreciated that during times of calibration for an optical design not totally dependent upon reflectance, any fluid particle measurement cell, illustrated by exemplary cell 22, which is in optical alignment with the balance of the system, is either clear of fluid bearing particles, or made to appear as being optically clear in order that there is no outside particulate influence during the calibration procedure. At the completion of calibration, the disc is made to stop with the illustrated removed segment in the optical axis path B–B', as shown in FIG. 1.

If beam splitters or other similar devices are utilized, it is easily appreciated that the calibration disc 10 need not necessarily be disposed within the line of the optical path defined by optical axis B–B', but can be disposed transversely to an optical path C–C' split by a beam splitter 24 from the main optical axis B–B', as is schematically illustrated in part in FIG. 3. It will be appreciated that other standard optical components, such as an additional lens 26 and a lamp 28, are needed for completion of the optical portion of the illustrated embodiment.

This invention can apply to use with measuring cells of a kind illustrated in the before mentioned concurrently filed and copending patent application entitled "APPARATUS FOR AND METHOD OF AUTOMATICALLY DETERMINING VELOCITY RELATED PARAMETERS OF FLUID BORNE COLLOIDAL SUSPENSIONS", for applicant Roger Morton and U.S. Pat. No. 3,723,712 entitled "METHOD FOR AGGLOMERATION MEASURING AND CONTROL" issued in the names of applicants Thomas R. Komline, Sr. and Walter R. Wills and assigned to Komline-Sanderson Engineering Corporation, Peapack, New Jersey.

In operation, calibration information is obtained from the areas of contrast rotating at the controlled velocity before the analytical system 14, including an optical portion, scanning devices and signal generation devices which operate in accordance with the principles and the manner set forth in the disclosure of copending patent application entitled "METHODS OF AND APPARATUS FOR DETERMINING THE QUANTITY AND PHYSICAL PARAMETERS OF OBJECTS", Ser. No. 210,278, filed Dec. 20, 1971 now U.S. Pat. No. 3,805,028 issued on Apr. 16, 1974 for applicant Roger Morton and assigned to Bausch & Lomb Incorporated, and in the manner further disclosed in applicant's beforementioned patent application concurrently filed with the present application.

The described calibration system and embodiment is for calibration of the analytical portion of the system and not specifically for the optical portion. If the optical portion, which in a system having electronic and mechanical components is the least likely to need calibration after manufacturing, is to be calibrated, it is most suitable to provide an optical calibration disc for disposition in the optical plane of focus passing through the measuring cell. With the measuring cell removed which can readily be accomplished under manufacturing conditions, calibration of the optical system can easily be conducted. From a practical standpoint, generally, optical calibration need not be considered again in the type of analytical systems under consideration. As the net motion of the particles, including out-of-focus particles on opposite sides of the plane of focus passing through the cell, is zero, any error generated due to these particles is negligible and has no adverse affect in the computation of zeta potential.

The following is claimed:

1. A calibration apparatus for calibrating a particle velocity measuring instrument defining an optical path for optically viewing particulate matter to generate signals as a function of the velocity of the particulate matter, comprising:

a disc disposed for receiving light emanating from along the defined optical path;

areas of contrast disposed upon the disc for receiving the light emanating from along the optical path to be optically viewed by the particle velocity measuring instrument; and means for moving the areas of contrast disposed upon the disc at a predetermined rate across the received light emanating from along the optical path for the generation of calibration signals as a function of the velocity of the areas of contrast traversing the received light at a predetermined rate.

2. The calibration apparatus as defined in claim 1, wherein the areas of contrast upon the disc are disposed for traversing the optical path defined by the velocity measuring instrument.

3. The calibration apparatus as defined in claim 1, including means for passing light emanating from along the defined optical path to the disc and the areas of contrast disposed upon the disc where the disc and the areas of contrast are disposed outside the optical path defined by the velocity measuring instrument.

4. The calibration apparatus as defined in claim 3, wherein the means for passing light emanating from along the defined optical path is a beam splitter disposed for receiving light along the defined optical path.

5. The calibration apparatus as defined in claim 1, wherein the disc is substantially flat and has disposed on one of its surfaces, areas of contrast which have optical properties differing from the optical properties of the disc.

6. The calibration apparatus as defined in claim 1, wherein the disc is translucent and the areas of contrast disposed upon the disc are substantially opaque.

7. A particle velocity measuring instrument, comprising:
    viewing means for optically viewing particulate matter in a field of view to form images thereof;
    scanning means for periodically scanning the formed images of the particulate matter to generate video signals as a function of the movement of the images between respective fields of view;
    electronic means receiving the video signals for generating a velocity related signal as a function of the movement of the particulate matter between respective fields of view; and
    a calibration disc having areas of contrast, further including means for rotating the areas of contrast at a predetermined rate for the viewing means to form images thereof in a field of view for scanning of the images of the areas of contrast by the scanning means for the electronic means to generate calibration signals as a function of the predetermined rate of rotation of the calibration disc.

8. A method of generating calibration signals for calibrating a particle velocity measuring instrument adapted for analytical study of particulate matter where the instrument has a viewing system for optically viewing particulate matter and a scanning system to scan formed images of the particulate matter and a signal generator for generating signals as a function of particulate matter movement detected during scanning over a period of time, comprising the steps of:
    providing a beam of light to define an optical path of the viewing system;
    providing a disc;
    providing areas of contrast to move in cooperation with the disc;
    disposing the areas of contrast in cooperation with the disc to intersect light emanating from the optical path of the viewing system;
    moving the disc at a predetermined rate for the areas of contrast to traverse the light emanating from the optical path to modulate the intensity of the light received by the viewing system;
    forming images of the moving areas of contrast as a function of the modulated light received by the viewing system;
    scanning the formed images of the areas of contrast over a period of time to generate video signals as a function of the movement of the scanned images and corresponding areas of contrast; and
    generating calibration signals as a function of the video signals and the velocity of the areas of contrast traversing, at a predetermined rate, the light emanating from the optical path.

9. The method of generating calibration signals as defined in claim 8, wherein the step of providing the areas of contrast includes disposing the areas of contrast upon a surface of the disc.

10. The method of generating calibration signals as defined in claim 9, wherein disposing the areas of contrast upon the surface of the disc includes varying the optical properties of the areas of contrast to provide optically evident differentiation between the areas of contrast and the disc for the formation of images of the areas of contrast by the viewing system.

11. The method of generating calibration signals as defined in claim 8, wherein the step of disposing the areas of contrast in cooperation with the disc to intersect light emanating from the optical path of the viewing system includes disposing the areas of contrast in cooperation with the disc outside of the optical path of the viewing system and further including the step of passing light emanating from the optical path of the viewing system to the areas of contrast for the formation of images of the moving areas of contrast by the viewing system for the generation of calibration signals as a function of the velocity of the areas of contrast.

* * * * *